April 16, 1940.                M. LEE                2,197,728
               CONDUCTOR SUPPORTING BASE CLAMP
                     Filed Aug. 17, 1938
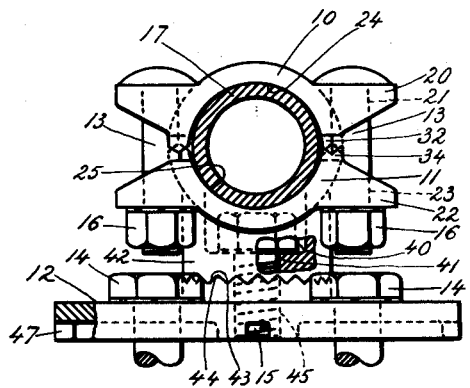
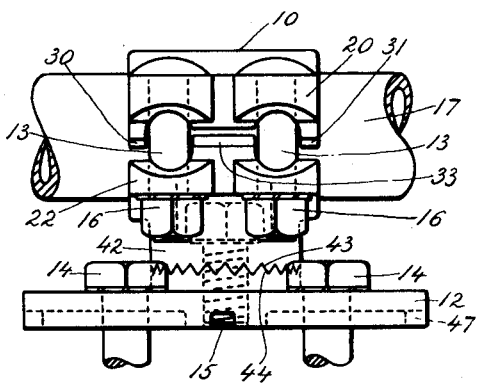
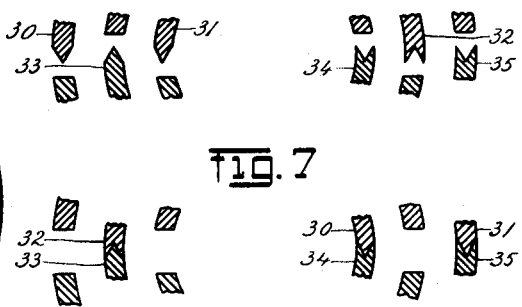
INVENTOR.
MARVIN LEE
BY Harry Ernest Rubens
ATTORNEY.

Patented Apr. 16, 1940

2,197,728

UNITED STATES PATENT OFFICE 2,197,728

CONDUCTOR SUPPORTING BASE CLAMP

Marvin Lee, Rye, N. Y., assignor to Burndy Engineering Co. Inc., a corporation of New York Application August 17, 1938, Serial No. 225,274

3 Claims. (Cl. 248—74)

My invention relates to supporting clamps for electrical conductors and more especially, supporting clamps for tubular electrical conductors.

In outdoor electrical substations the electrical bases are usually supported by a framework of steel on which are mounted insulators which in turn support the clamps which grip the conductor. The bolt and rivet holes in the steel framework are generally pre-punched. Often, because of revisions in plans, or other causes, the holes for mounting the insulators may be so aligned that some compensation may be necessary in the clamp supporting the conductor for varying the angle at which the conductor is held.

One object of my invention, therefore, is to provide a supporting clamp which will permit the conductor to be supported in a plane parallel to the base and at any direction in that plane.

I obtain such compensations in my bus support clamp by two adjustments, a coarse adjustment and a fine adjustment. The coarse adjustment is obtained by means of a series of interlocking teeth in the neck of the clamp. When the proper adjustment has been made the neck is clamped into a solid unit by a bolt passing through it. The fine adjustment is made by slots in the base. The bolts which mount the bus support clamp to the insulator cap pass through these slots and a limited variation of angle is permitted while the bolts are loose. When they are tightened the bus support clamp is held rigidly to the cap of the insulator.

A further object, therefore, is to provide adjusting means whereby clamps may fixedly support the conductor in a plane parallel to the base in any desired angle.

In outdoor substations it is desirable at times to grip the bus firmly at some points and to permit it to slide freely in a longitudinal direction at other points, although the bus is restrained from motion in other directions. The reason for this is mainly a result of the expansion and contraction of the conductor due to thermal changes. Such changes occur because of seasonal variations in temperature, heating and cooling due to changes in amount of current carried, heating due to absorption of solar energy, cooling due to air currents, etc. If the forces caused by expansion or contraction of the bus are not compensated, they may cause the insulators to crack or otherwise damage the bus supporting structure. The easiest way to compensate for change in length due to temperature change, is to permit the bus to expand or contract. One method of doing this in a bus of several spans, supported at several points by bus support clamps, is to grip the bus rigidly in one clamp and permit it to slide freely through the other bus support clamps holding it along its length. It is sometimes inconvenient to determine which bus support clamps should be a tight fit and which should be a sliding fit before actual installation. For greatest convenience, therefore, it is desirable that the bus support clamps should be so constructed as to be readily used either as a tightly fitting clamp or a clamp with slide fit.

Another object of my invention is to provide a supporting clamp which may be used to grip the conductor rigidly or which may permit the conductor to slide lengthwise, as desired.

To accomplish this I make the cap of my clamp with projections which do not engage with projections on the body of my clamp in one position, but engage when the cap is reversed. When the projections do not engage, the clamp grips the conductor rigidly; when the projections engage, the clamp permits a slide fit on the conductor.

An additional object is to provide a conductor supporting base clamp in which the cap may be reversed and interlocked with the body thereof depending on whether a tight or loose connection is desired.

In making bus support clamps it is often advantageous to recess the bases. This effects an economy in the amount of metal used in the manufacture of the clamp. In addition, because the galvanized cap of the insulator may sometimes be rough, it permits the clamp to seat itself solidly on the cap of the insulator, rather than ride on some high point. However, unless provision is made, water may collect in these recesses, freeze, and crack the base of the clamp or damage the insulator itself.

I prevent this by providing drainage slots in the base of my supporting clamp which permits water to flow freely and prevent accumulation of moisture.

I accomplish these and other objects and obtain my new results as will be apparent from the device described in the following description, particularly pointed out in the attached claims, and illustrated in the accompanying drawing, in which:

Fig. 1 is an end view of my novel clamp illustrating a conductor rigidly supported.

Fig. 2 is a side view of the same.

Fig. 3 is a top view.

Fig. 4 is a plan view of the base illustrating the toothed support.

Fig. 5 is an end view with the position of the cap reversed to provide a sliding support for the conductor.

Fig. 6 is a diagrammatic view of the side projections for providing a rigid conductor support.

Fig. 7 is a similar view of the side projections interlocked, cap reversed, to provide a sliding support for the conductor.

The clamp comprises a cap 10, a body 11, and base 12, together with side bolts 13, base bolts 14, and neck bolt 15, for locking the body to the base.

The cap is provided with ears 20, preferably four in number, perforated at 21 for entrance of the side bolts 13. Similarly body 11 is provided with corresponding ears 22, perforated as at 23. The cap and body are semi-cylindrically formed, as at 24 and 25 to conform with the shape of the conductor 17. The cap is furthermore provided with projection 30 and 31 on the left side and 32 on the right side. Body 11 is similarly provided with projections 33, on the left side, and 34 and 35 on the right side. These are shown diagrammatically, in section, in Fig. 6. As shown in Figs. 1, 2 and 6, the projections are arranged so that the conductor 17 will be gripped and rigidly supported, when the side bolts 13 are tightened by means of nuts 16. The semi-cylindrical surfaces 24 and 25 engage the surface of the conductor preventing longitudinal movement.

When it is desired to provide a loose connection, the cap 10 is rotated 180 degrees, permitting pointed projection 30 and 31 to engage correspondingly indented projections 34 and 35 of the body, with pointed projection 33 engaging correspondingly indented projection 32 of the cap.

A three pointed support is thus provided fixing the position of the semi-cylindrical surfaces with respect to each other so that the conductor 17 may be loosely supported therein, the clearance designated by the letter "A," see Fig. 5, being preferably in the neighborhood of $\frac{1}{16}$ of an inch. Any desired clearance could be obtained by properly designing the supporting projections.

The reversed position of the cap, supported on the body, is shown in Fig. 5, and the projections diagrammatically illustrated in Fig. 7.

The pointed projections 30, 32 and 33 can be adjustably provided by pointed screws, locked in the desired position for varying the spacing between the semi-cylindrical surfaces illustrated in Fig. 5, as well as for changing the longitudinal axis of the supporting surfaces with respect to the base.

The body section is provided with a centrally located recess 40 accessible when the cap and conductor are removed. Extending therefrom is a transverse bore 41, passing through the neck 42 of the body.

The base bolt 15 is supported in the recess 40, its shank passing through the bore 41. The neck 42 of the body 11 is preferably circular in cross-section and terminates in a platform of radially extending teeth 43, preferably 48 in number. The base bolt 15 passes through the center of the teeth. A similar set of teeth 44 is provided in the base 12, having a central threaded bore 45 for threadedly engaging the bolt 15 to the base and adjustably locking the body to the base by means of the teeth.

The base 12 extends peripherally about the section containing the teeth to permit apertures 46, preferably four in number, to be located therein, for the base bolts 14 to pass therethrough, locking the base 12 to the supporting structure not shown. The base is recessed as at 47 to reduce its weight and is provided with drainage slots 48 to permit the water to seep through.

The apertures 46 are elongated to provide a further movement of the base with regard to its support for approximately 10 degrees. Since the teeth are 48 in number, a 7½ degree adjustment is permitted by this method, with the result that any finer adjustment to 10 degrees may be made through the base apertures. An exact location of the supporting surfaces with respect to the base may thus be accomplished.

Where an adjustment of the longitudinal axis of the semi-cylindrical surfaces with respect to the base is desired, for supporting the conductor in a non-parallel position to the base, an adjustable neck section for the body or base may be provided, of familiar design. Two tooth surfaces, at right angles to the teeth shown, may be designed with locking bolt, for varying the angle of support. If such an arrangement is attached to the body, the connecting bolt 15 may be inserted through the base to engage the tooth section which is in turn locked to the body.

I have in the foregoing description described a clamp which will permit either a tight or sliding connection with the conductor, as circumstances dictate. The conductor is supported in a plane parallel to the base, mounted so as to obtain any desired inclination. By my arrangement of a horizontal tooth support, the body of the clamp may be rotated with respect to the base to any degree, depending on the number of teeth; and by elongating the base slots a still finer adjustment can be made where the teeth are not numerically sufficient. The base is recessed to provide a better seat and for reducing the weight; and drainage slots further provided through to the outer surface to prevent the accumulation of water.

I have thus described my invention, but I desire it understood that it is not confined to the particular forms or uses shown and described, the same being merely illustrative, and that the invention may be carried out in other ways without departing from the spirit of my invention, and, therefore, I claim broadly the right to employ all equivalent instrumentalities coming within the scope of the appended claims, and by means of which, objects of my invention are attained and new results accomplished, as it is obvious that the particular embodiments herein shown and described are only some of the many that may be employed to attain these objects and accomplish these results.

What I claim and desire to secure by Letters Patent is as follows:

1. A conductor supporting bracket comprising a cap, a body, a base, said body and cap provided with semi-cylindrically formed conductor engaging surfaces; means for locking the cap to the body and means forming a part of said cap and body for varying the position of the semi-cylindrically formed conductor engaging surfaces with respect to each other.

2. A conductor supporting bracket comprising a cap, a body, a base, said body and cap provided with semi-cylindrically formed conductor engaging surfaces; means for locking the cap to the body, and means forming a part of said cap and body for supporting the cap to the body at a plurality of positions, one for providing a conductor clamping engagement, and the other for providing a sliding conductor supporting surface.

3. A conductor supporting bracket comprising a cap, a body, having a neck terminating in extending toothed surfaces, a base having a projecting body terminating in extending tooth surfaces for engaging the corresponding surface of the body, said base provided with elongated slots for locking the base to a supporting structure by means of bolts and for adjusting the position of the base with respect to its supporting surface.

MARVIN LEE.